Patented Nov. 21, 1933

1,935,648

UNITED STATES PATENT OFFICE 1,935,648

MANUFACTURE OF HALOGENATED AROMATIC COMPOUNDS

Joseph R. Mares, St. Louis, Mo., assignor, by mesne assignments, to Monsanto Chemical Company, a corporation of Delaware No Drawing. Application April 3, 1931
Serial No. 527,611

4 Claims. (Cl. 260—161)

This invention relates to the manufacture of halogenated aromatic compositions and has particular application to the chlorination of hydrocarbons of the benzene series.

Heretofore, it has been proposed to chlorinate benzene both in liquid and vapor phase by means of elemental chlorine. According to this process, one mol of hydrogen chloride is formed as a by-product for each atom of chlorine introduced into the benzene ring. The hydrogen chloride is absorbed in water and sold as muriatic acid. It has likewise been proposed that benzene be halogenated by causing a vaporous mixture of benzene, hydrochloric acid and oxygen to pass over a catalyst. In this process, it is necessary to vaporize aqueous hydrogen chloride which in plant scale operation is difficult of attainment. While the former process is wasteful of chlorine in that one half thereof forms by-product hydrogen chloride, it nevertheless has the advantage over the muriatic acid chlorination process in that the conditions of the reaction are such as to enable one to control the reaction more easily as well as to design equipment in which the reaction may be conducted without difficulty.

By practicing the present invention, the disadvantages of both of the former processes are largely overcome, and at the same time the advantages of each are retained.

One object of the present invention is to afford a method of chlorinating benzene hydrocarbons whereby the yield of chlorinated hydrocarbons is improved and the by-product formation is substantially eliminated.

A further object of the invention resides in providing a process for chlorinating benzene with a gas containing relatively small amounts of chlorine which cannot be liquefied economically.

The invention likewise contemplates a process whereby aromatic hydrocarbons may be chlorinated by means of chlorine without formation of by-product hydrogen chloride and at the same time substantially doubling the yield of chlorinated products which is obtainable by present day practice.

A further object of the invention is to provide a process wherein a mixture of hydrogen chloride and chlorine together with oxygen may be employed in the chlorination of aromatic hydrocarbons. These, together with other objects and advantages of the invention will become more readily apparent from the description herein set forth.

Briefly stated, the invention contemplates conducting the mixture of chlorine, oxygen and the benzene over a catalyst at regulated temperatures whereby the chlorine is consumed completely and recovering in the form of chlorbenzenes without the formation of hydrogen chloride as a by-product.

The reacted vapor mixture consists essentially of chlorinated benzene, unreacted excess benzene, a small amount of hydrogen chloride and any inert gases which were present in the initial gas mixture. The condensate formed upon cooling consists of an aqueous layer containing a small amount of unreacted hydrogen chloride and a nonaqueous layer consisting of benzene, monochlorbenzene, ortho- and paradichlorbenzenes, together with small amounts of higher chlorinated benzene compositions. The two layers may be separated conveniently by decantation after which the nonaqueous layer is washed with a small quantity of alkali, such as soda ash, to neutralize any acid which is dissolved therein, and subsequently separated into its components, as by fractional distillation.

In general, other conditions being the same, polychlorbenzene formation increases with increased initial concentration of available chlorine either in the form of chlorine or hydrogen chloride and oxygen. In practice, I have found it preferable to employ a substantial excess of benzene over that which would theoretically be required by the amount of available chlorine employed. In case a mixture of chlorine and hydrogen chloride is utilized to effect chlorination, an excess of benzene is likewise to be preferred, particularly when the monochlor benzene is desired as the principal product.

Inasmuch as the oxygen present tends to oxidize the benzene to carbon dioxide particularly when the catalysis is conducted at relatively high temperatures, the proportion of oxygen should be restricted as much as possible. For the purpose of this application, a low temperature is one not substantially above 200° C. whereas a high temperature is understood to be 300° C. or above. If desired, steam may be introduced into the unreacted gas mixture which may supply at least a part of the oxygen which is normally required.

A large variety of catalysts may be employed successfully. Certain of these are particularly suited to low temperature operation, whereas others are relatively inactive at low temperatures, but may be employed successfully at elevated temperatures. In general, Deacon process catalysts will be found adapted to high temperature chlorination. An embodiment of a catalyst of such type may be prepared by spraying a solution of copper chloride on pumice stone fragments and dried. A catalyst which will be found well suited for operation at lower temperatures may be prepared by causing sodium aluminate to react with salts, such as the chlorides, of iron, copper or cerium, or mixtures of these. The resulting gelatinous precipitate is dried and broken into fragments, or may first be deposited upon a carrier such as pumice stone, kieselguhr, silica, etc., and thereafter dried. This mass will be found to operate successfully at temperatures as low as 200° C. and also at high temperatures.

*Example 1.*—In practicing the invention using the Deacon process catalyst, treated pumice stone fragments are charged into a tube or receptacle of acid resistant material which may be provided with heating means or a gas preheater capable of establishing and maintaining a temperature of approximately 400° C. in the reaction zone. A gas mixture containing benzene, chlorine and oxygen in the ratio of 20 parts by volume of benzene, 5 parts by volume of chlorine and 3 parts by volume of oxygen, together with inert gases, such as, nitrogen which is normally present in small amounts in chlorine gas as well as being associated with oxygen of the air is conducted over the mass. The vapors are condensed advantageously with the aid of a water spray and form into two layers, one consisting essentially of benzene and chlorinated benzene derivatives, whereas the other consists essentially of a dilute aqueous solution of hydrogen chloride.

Inasmuch as some benzene remains in the uncondensed vapors, it is desirable in large scale installations (preferably after washing the gases with an alkaline solution) to compress and cool the gases to improve the recovery of benzene.

The benzene condensate layer is separated from the aqueous layer and after being neutralized with soda ash is fractionated whereby an accurate separation of benzene, monochlorbenzene and dichlorbenzene is obtained.

*Example 2.*—By substituting a more active catalyst for the Deacon catalyst described above, one may operate at a relatively lower temperature (200° C. being readily feasible). A gaseous mixture containing benzene, chlorine and oxygen in the ratio of 20 parts by volume of benzene, 5 parts of chlorine and 5 parts of oxygen may be employed to advantage. In other respects the procedure is analogous to that set forth in Example 1.

By increasing the relative amount of chlorine or decreasing the amount of benzene more of the higher halogen derivatives are obtained. At the lower reacting temperature, the tendency to oxidize the benzene to carbon dioxide is diminished, and the yield of recoverable materials improved. If desired, one may admix water vapor with the gases as well as vapors of commercial hydrochloric acid. In the latter case, the ratio of benzene and air should be adjusted to account for the change in composition of the chlorinating agent.

Since the concentration of the chlorine in the reacting mixture may be relatively small, one may employ the off gases or non-liquefiable fractionation of the chlorine which is produced in the manufacture of liquid chlorine.

In present day practice chlorine obtained from the electrolysis of brine is cooled and compressed whereby substantially all of the chlorine is liquefied. The vaporous residues obtained are however rich in chlorine and well adapted for use in the present process either when admixed with oxygen or together with free hydrogen chloride. Frequently, the other gases admixed with chlorine include nitrogen and oxygen which function to supply at least part of the requirements of this gas to the present reaction. The present process is likewise well suited to be used in conjunction with a process such as the Deacon process wherein hydrogen chloride is oxidized by means of oxygen. The invention is, therefore, particularly adaptable to the manufacture of chlorbenzenes from waste chlorine gases and eliminates the formation and necessity for recovering of by-product hydrogen chloride as has been customary and necessary heretofore.

It is to be understood that the invention is not limited to the chlorinating of benzene, but is likewise applicable to the chlorinating of analogous aromatic compositions including toluene, xylene, naphthalene, as well as nuclear substitution products such as benzoic acid and phthalic anhydride.

What I claim is:

1. The method of chlorinating aromatic hydrocarbons that consists in causing an aromatic hydrocarbon to react in vapor phase with chlorine and oxygen in the presence of a catalyst containing a compound of aluminum and at least one other element selected from a group consisting of copper, iron and cerium.

2. The method of chlorinating aromatic hydrocarbons which comprises causing a vapor mixture of such hydrocarbon together with oxygen and chlorine to react in the presence of a catalyst which promotes the liberation of chlorine from hydrogen chloride, said catalyst containing a compound of aluminum and at least one other element selected from a group consisting of copper, iron and cerium.

3. The method of chlorinating aromatic hydrocarbons which comprises causing a vapor mixture of such hydrocarbon together with oxygen and chlorine to react in the presence of a catalyst which promotes the liberation of chlorine from hydrogen chloride, said catalyst containing a compound of aluminum and at least one other element selected from a group consisting of copper, iron and cerium, the catalytic reaction being effected at approximately 200°–400° C.

4. The method of chlorinating benzene which comprises causing a vapor mixture of benzene, oxygen and chlorine to react in the presence of a catalyst containing a compound of aluminum and at least one other element selected from a group consisting of copper, iron and cerium, the reaction being effected at approximately 200°–400° C.

JOSEPH R. MARES.